United States Patent [19]

Janoe et al.

[11] 4,188,963
[45] Feb. 19, 1980

[54] PORTABLE TENT/CANOPY FOR JEEPS

[76] Inventors: Charles E. Janoe; George Spector, both c/o George Spector, 3615 Woolworth Bldg., 233 Broadway, New York, N.Y. 10007

[21] Appl. No.: 952,482

[22] Filed: Oct. 18, 1978

[51] Int. Cl.² ................................................ B60P 3/34
[52] U.S. Cl. .................................. 135/1 A; 135/5 A; 135/7.1 A
[58] Field of Search .......... 135/1 A, 3 A, 5 A, 5 AT, 135/7.1 A; 296/23 H, 23 C

[56] References Cited

U.S. PATENT DOCUMENTS

| | | | |
|---|---|---|---|
| 3,056,415 | 10/1962 | Nimmo | 135/7.1 A |
| 3,194,251 | 7/1965 | Pettersen | 135/1 A |
| 3,371,954 | 3/1968 | Larsson | 135/1 A |
| 3,399,922 | 9/1968 | Burton | 135/1 A |
| 3,464,735 | 9/1969 | Smith | 135/1 A |
| 3,737,190 | 6/1973 | Smith | 135/1 A |
| 3,917,337 | 11/1975 | Couix | 135/1 A |

Primary Examiner—Reinaldo P. Machado

[57] ABSTRACT

A portable tent/canopy that can be easily opened up for use on a jeep, and including a canvas cover placed over a pipe framework mountable on the jeep, and opposite side ends of the framework and cover being extendable so to enclose a larger area.

4 Claims, 9 Drawing Figures

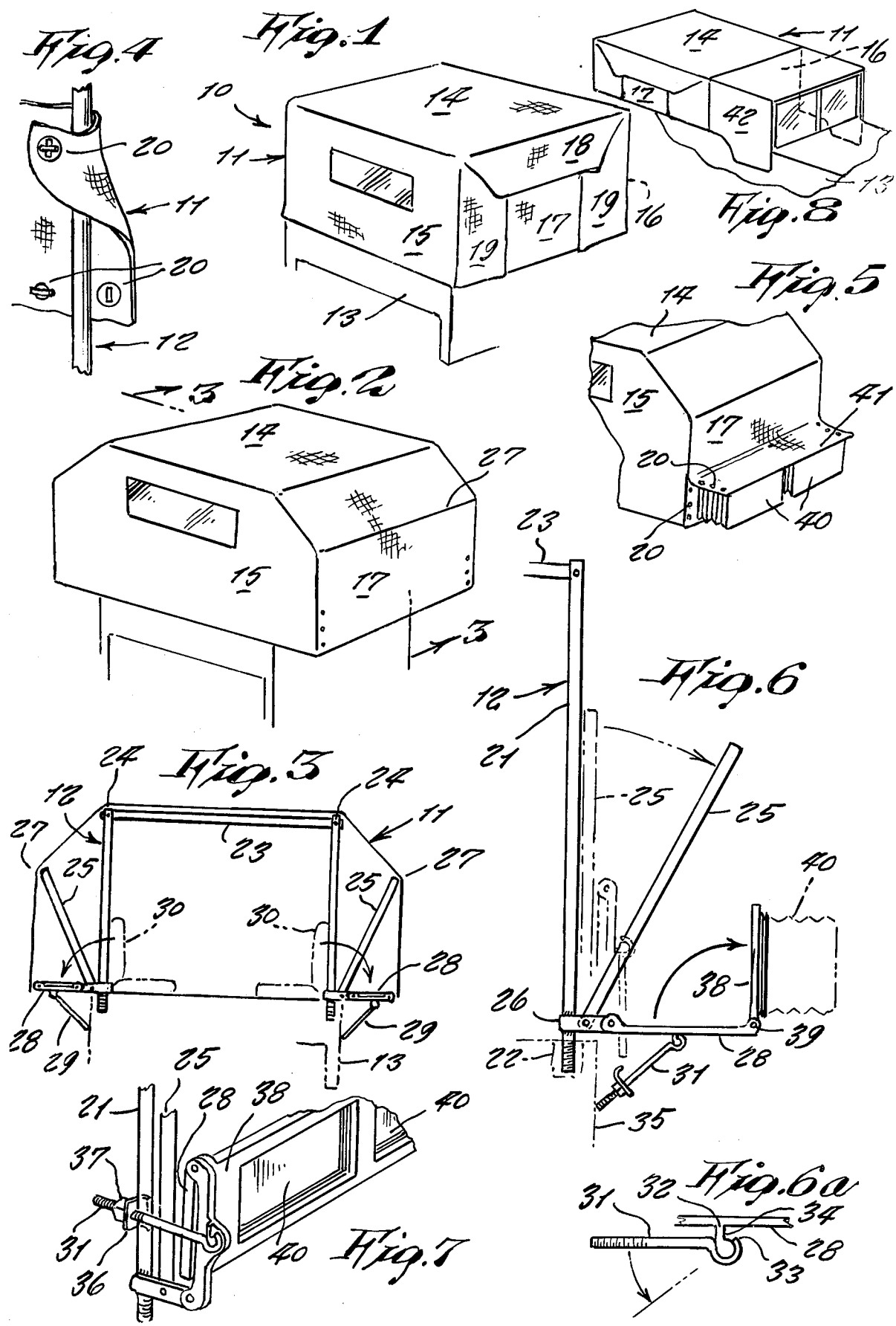

PORTABLE TENT/CANOPY FOR JEEPS

This invention relates generally to portable enclosures.

A principal object of the present invention is to provide a tent/canopy that is installed upon a jeep or similar vehicle, the tent/canopy being able to be quickly and easily erected or taken down, so to save time and labor compared to tents set up upon a ground.

Another object is to provide a tent/canopy that is readily expandable in width so as to more comfortably shelter several persons or taller persons when laying down to sleep.

Still a further object is to provide a tent/canopy which in another design additionally includes flaps that extend from the tent to a position over a drivers head and are connected to a windshield frame so to protect the driver during incliment weather.

FIG. 1 is a perspective view of the jeep tent shown closed.

FIG. 2 shows it extended open.

FIG. 3 is a cross section on line 3—3 of FIG. 2 and shown including an extendable bag for the feet of a relatively taller person.

FIG. 4 is a detail of tent canvas securement around the poles.

FIG. 5 is a detail of FIG. 2 shown with bags in extended positions.

FIG. 6 is a detail of the frame structure shown in FIG. 3.

FIG. 6a is an enlarged detail of the brace pivot shown in FIG. 6, and showing a brace stop that limits the brace pivoting so to require no locking when in bracing position, for easier setting up or folding away.

FIG. 7 shows a brace used for clamping the frame structure securely together when the tent is closed.

FIG. 8 is a perspective view of a design that includes flaps for extending over a drivers head and attached to a windshield frame.

Referring now to the drawing in greater detail, and more particularly to FIGS. 1 through 4 at this time, the reference numeral 10 represents a tent/canopy according to the present invention wherein there is a tent member 11 made of foldable canvas and which is supported upon a framework 12 that is mounted upon a body of a jeep automotive vehicle 13 or the like.

The tent includes a roof 14 and opposite front and rear walls 15 and 16 which at their opposite ends can be folded respectively down and around opposite side walls 17 so that the tent may be limited in width to that of the vehicle particularly if the vehicle is moving, or if its full size is not needed. However, when more space is needed under the tent, the side walls can be pushed outwardly, as shown in FIG. 2. In its retracted position the flaps 18 and 19 may be secured by suitable fasteners 20 such as are used for also securing the tent around the framework.

The framework is comprised of metal, tubular pipes and bars as shown. Vertical pipes 21 serving as posts may be threaded on their lower ends so to set up in threaded brackets 22 screwed to the jeep, and bars 23 are secured between the tops of the posts by removable screws and wing nuts as shown at 24. The sidewardly extendable ends of the tent are supported in extended position by inclined arms 25 pivoted from a collar 26 mounted around a base of the posts, and which rest into a corner 27 formed on the tent.

A sideboard 28 pivotally supported from the collars 26 is adjustable to either hang down out-of-the way along a side of the vehicle when not in use, or else to be pivoted up into a horizontal position so to form additional flooring at each end of the tent. Braces 29 braced against the vehicle body sides support the side boards in this position.

In use the seat backrests 30 may be laid over the side boards for resting thereupon.

In a modified design of the invention shown in FIGS. 5, 6, 6a and 7, another design of brace 31 is used instead of brace 29 as it is self locking in braced position so to eliminate manually doing the same. Brace 31 pivots from an extension 32 on an underside of the side board 28.

When an end 33 of the brace abuts against a face 34 of the extension, the brace is stopped from further pivoting so to rest stationarily against the jeep body 35 as shown in FIG. 6. When pivoted into the position shown in FIG. 7, an angle 36 is slipped on the brace so to hold the framework arm 25 and sideboard 28 locked in stored position against the post 21. The brace is threaded and a nut 37 holds the angle on the brace.

The design shown in FIGS. 5, 6 and 7 also includes a sideboard 38 pivotally attached by hinge 39 to the side board 28 and which includes accordian pleated boxes 40 that provide additional sideward extensions when needed for still taller persons. In use, the sideboard 38 is in a vertical position as shown in FIGS. 5 and 6, and a lower end 41 of the tent is draped thereacross.

In a further modified design shown in FIG. 8, flaps 42 are attached to the tent so to extend over a drivers seat in order to protect a driver from rain. The flap edges are secured to the windshield frame by suitable fasteners 20.

What is claimed is:

1. A tent/canopy for a jeep automotive vehicle comprising in combination, a tent made of canvas and a framework made of metal pipe and bars for supporting said tent, said framework being removably mounted upon brackets screwed upon said jeep, said framework including sidewardly extendable sideboards with accordian pleated, extendable boxes, and said tent having opposite sidewardly extendable portions.

2. The combination as set forth in claim 1 wherein said tent sidewardly extendable portions are folded over against a side wall of said tent when said tent is in a non-extended position.

3. The combination as set forth in claim 2 wherein said sideboards are each pivoted on a second sideboard that is supported in a horizontal position by braces pivotable aginst a stop of an extension on an underside of said second sideboard.

4. The combination as set forth in claim 3 wherein each corner of said frame work includes a pipe post screwed into said bracket and a collar around said post pivotally supporting a sidewardly pivotable arm for resting in an upper corner of said tent, upper ends of said posts being connected by cross bars.

* * * * *